US008769711B2

(12) United States Patent
Jähnke (10) Patent No.: US 8,769,711 B2
(45) Date of Patent: Jul. 1, 2014

(54) METHOD FOR EXAMINING A MEASUREMENT OBJECT, AND APPARATUS

(75) Inventor: Torsten Jähnke, Lychen (DE)

(73) Assignee: JPK Instruments AG, Berlin (DE)

( * ) Notice: Subject to any disclaimer, the term of this patent is extended or adjusted under 35 U.S.C. 154(b) by 633 days.

(21) Appl. No.: 12/083,303

(22) PCT Filed: Jun. 30, 2006

(86) PCT No.: PCT/DE2006/001131
§ 371 (c)(1),
(2), (4) Date: Mar. 19, 2009

(87) PCT Pub. No.: WO2007/041976
PCT Pub. Date: Apr. 19, 2007

(65) Prior Publication Data
US 2009/0205089 A1 Aug. 13, 2009

(30) Foreign Application Priority Data
Oct. 13, 2005 (DE) .......................... 10 2005 049 562

(51) Int. Cl.
*G01Q 60/24* (2010.01)
(52) U.S. Cl.
USPC ............ 850/33; 850/5; 850/6; 850/7; 850/21; 850/30
(58) Field of Classification Search
USPC .................. 850/5, 6, 7, 30, 33, 40, 52, 62
See application file for complete search history.

(56) References Cited

U.S. PATENT DOCUMENTS

| 5,952,562 | A | * | 9/1999 | Yagi et al. ........................ 73/105 |
| 6,452,161 | B1 | | 9/2002 | Yedur et al. |
| 2001/0030286 | A1 | * | 10/2001 | Egawa et al. .................. 250/309 |
| 2002/0104963 | A1 | * | 8/2002 | Mancevski .................... 250/306 |

FOREIGN PATENT DOCUMENTS

| DE | 4233399 A | 4/1994 |
| JP | 7-055457 A | 3/1995 |

OTHER PUBLICATIONS

Optically Transparent Tip for Tunneling Microscopy, IBM Technical Disclosure Bulletin, Oct. 1987, p. 369-370, vol. 30, No. 5.
T. Fujii et al., Development of a new force microscope with a fluorescence optical microscope, Thin Solid Films, 1994, p. 407-410, vol. 243, Elsevier Sequoia.

* cited by examiner

*Primary Examiner* — Nicole Ippolito
*Assistant Examiner* — Hanway Chang
(74) *Attorney, Agent, or Firm* — Smith Patent Office (57) ABSTRACT

The invention relates to a method for examining a measurement object (2, 12), in which the measurement object (2, 12) is examined by means of scanning probe microscopy using a measurement probe (10) of a scanning probe measurement device, and in which at least one subsection (1) of the measurement object (2, 12) is optically examined by an optical measurement system in an observation region associated with the optical measurement system, wherein a displacement of the at least one subsection (1) of the measurement object (2, 12) out of the observation region which is brought about by the examination by means of scanning probe microscopy is corrected in such a way that the at least one displaced subsection (1) of the measurement object (2, 12) is arranged back in the observation region by means of a readjustment device which processes data signals that characterize the displacement.

25 Claims, 10 Drawing Sheets

METHOD FOR EXAMINING A MEASUREMENT OBJECT, AND APPARATUS

The invention relates to a method for examining a measurement object, in which the measurement object is examined by means of scanning probe microscopy using a measurement probe of a scanning probe measurement device, and in which at least one subsection of the measurement object is optically examined by an optical measurement system in an observation region associated with the optical measurement system. Furthermore, the invention relates to an apparatus with which the method can be implemented.

BACKGROUND OF THE INVENTION

Scanning probe microscopy (SPM) is a technique in which a measurement probe is scanned over a sample, which can also be referred to as the measurement object or as the measurement object to be examined, and the topography is determined via a distance-dependent interaction between the measurement probe and the sample. Material contrasts or other sample information can also be obtained. The most prominent examples of this measurement technique are the atomic force microscope (AFM) and the scanning tunneling microscope (STM). Further examples are the scanning near-field microscope (SNOM) and the scanning photon force microscope (SPhM).

In addition to imaging the measurement object, distance spectroscopy is another important examination method in all these techniques. Here, the measurement probe is displaced relative to the sample, in particular in the vertical direction or in any direction in space or in one plane, and the interaction is measured. In the case of atomic force microscopy, this method is used, for example, to measure the forces between molecules, one molecule being bound to the measurement probe and another molecule being bound to the sample. It is also possible to measure intramolecular forces, for example by lowering the measurement probe onto the sample and waiting on bonding. Thereafter, the measurement probe can be removed from the base on which the sample is arranged, and the force can be recorded. Further measurements may also be provided for, and such measurements are in part also carried out by measuring an interaction which is correlated with the distance between two or several points.

Optical methods such as fluorescence microscopy, for example, are able to supply information about the composition of the sample examined, for example by labeling particles with specific fluorescence markers. Furthermore, FRET (fluorescence resonance energy transfer), for example, allows the localization of two labeled molecules with respect to one another.

If SPM is used as the examination method, for example in the distance spectroscopy mode described above, often a displacement of the measurement object is produced which then also has effects on the fluorescence or other optical properties of the sample. In order to be able to optically observe these properties, an observation region of an optical measurement system which is used for the optical examination of the sample, preferably the focus, must spatially overlap with the optically examined section of the measurement object. The measurement object must also be close enough to the optical axis that it can be detected by the optical measurement system, for example by means of a measurement objective. Various scenarios for the displacement of the measurement object brought about by the examination by means of scanning probe microscopy are possible, in which the distance between the measurement object and the measurement objective is changed, as a result of which the measurement object is possibly displaced out of the observation region of the optical measurement system, for example the focusing plane of a measurement objective:

- The support for the sample is moved, for example by means of a piezo arrangement, in order to vary the distance between the sample and the measurement probe. If the object to be optically examined, in particular a subsection of the sample, is fixedly connected to the sample, this leads to defocusing.
- The measurement probe is moved by means of a piezo arrangement in order to vary the distance between the sample and the measurement probe. If the object to be optically examined is fixedly connected to the measurement probe, this leads to defocusing.
- If the measurement object is a part of the sample which is varied or displaced by the acting forces, defocusing will take place regardless of the moving part.

Since the stretching widths in distance spectroscopy may often be 100 µm or more, defocusing is not acceptable for the further optical examination.

SUMMARY OF THE INVENTION

The object of the invention is to provide an improved method and an improved apparatus which facilitate a combined examination of a measurement object by means of a scanning probe measurement device and an optical measurement system.

This object is achieved according to the invention by a method according to independent claim 1 and by an apparatus according to independent claim 17. Advantageous refinements of the invention form the subject matter of the dependent claims.

The invention provides a possibility for examining a measurement object both by means of scanning probe microscopy and optically, by correcting a displacement of the measurement object relative to the observation region of the optical measurement system that is brought about by the examination by means of scanning probe microscopy. As a result, the optical examination is possible despite the examination by means of scanning probe microscopy which takes place at the same time or in temporal association. In this way, it is easier for the user to use combined measurement methods for one and the same measurement object.

One preferred further development of the invention provides that, when the at least one subsection of the measurement object is arranged back in the observation region of the optical measurement system, the observation region is set in a changed manner.

In one expedient refinement of the invention, it may be provided that the optical measurement system is displaced when the observation region is set in a changed manner.

One advantageous embodiment of the invention provides that, when the at least one displaced subsection of the measurement object is arranged back in the observation region of the optical measurement system, a positioning of the measurement object is set in a changed manner.

One preferred further aspect of the invention provides that the at least one subsection of the measurement object is displaced out of the observation region in at least one of the following ways during the displacement brought about by the examination by means of scanning probe microscopy: three-dimensional displacement and displacement in a two-dimensional plane.

One preferred further development of the invention provides that the data signals that characterize the displacement are derived using data signals from the examination by means of scanning probe microscopy.

In one expedient refinement of the invention, it may be provided that the data signals from the examination by means of scanning probe microscopy are formed in such a way as to comprise data signals for a bending of the measurement probe during the examination by means of scanning probe microscopy.

One advantageous embodiment of the invention provides that the data signals from the examination by means of scanning probe microscopy are formed in such a way as to comprise data signals for a displacement of a measurement probe holder during the examination by means of scanning probe microscopy.

One preferred further aspect of the invention provides that the data signals from the examination by means of scanning probe microscopy are formed in such a way as to comprise data signals for a displacement of a support of the measurement object during the examination by means of scanning probe microscopy.

One preferred further development of the invention provides that the data signals from the examination by means of scanning probe microscopy are formed in such a way as to comprise data signals for a modeled behavior of the measurement object during the examination by means of scanning probe microscopy.

In one expedient refinement of the invention, it may be provided that the data signals from the examination by means of scanning probe microscopy are formed in such a way as to comprise data signals for an exterior shape change of the measurement object during the examination by means of scanning probe microscopy.

One advantageous embodiment of the invention provides that the data signals from the examination by means of scanning probe microscopy are formed in such a way as to comprise distance spectroscopy data signals.

One preferred further aspect of the invention provides that the data signals from the examination by means of scanning probe microscopy are formed in such a way as to comprise atomic force data signals.

One preferred further development of the invention provides that, during the examination by means of scanning probe microscopy using the scanning probe measurement device, at least one of the following methods is carried out: atomic force microscopy, scanning tunneling microscopy, scanning photon force microscopy and scanning near-field microscopy.

In one expedient refinement of the invention, it may be provided that, during the optical examination using the optical measurement system, at least one of the following methods is carried out: examination by means of optical microscopy, fluorescence measurement method and absorption measurement method.

One advantageous embodiment of the invention provides that, during the optical examination of the at least one subsection of the measurement object, a focusing region of the optical measurement system is used as the observation region and the at least one displaced subsection of the measurement object is arranged back in the focusing region of the optical measurement system by means of the readjustment device.

Refinements of the apparatus according to the invention will be described below.

One preferred further aspect of the invention provides that the readjustment device features a positioning device of the optical measurement system for displacing at least one displaceable part of the optical measurement system. A readjustment of the entire optical measurement system by means of the readjustment device may also be provided, namely a three-dimensional displacement of the optical measurement system. This may be provided, for example, if the measurement probe and the subsection of the measurement object are also displaced jointly relative to the observation region during the examination by means of scanning probe microscopy.

One preferred further development of the invention provides that the readjustment device features a positioning device of the measurement probe of the scanning probe measurement device for displacing the measurement probe.

In one expedient refinement of the invention, it may be provided that the readjustment device features a positioning device of a support for the measurement object for displacing the measurement object.

One advantageous embodiment of the invention provides that the readjustment device is assigned a measurement device for measuring a bending of the measurement probe during the examination of the measurement object by means of scanning probe microscopy.

One preferred further aspect of the invention provides that the readjustment device is assigned a measurement device for measuring a displacement of the holder for the measurement object during the examination of the measurement object by means of scanning probe microscopy.

One preferred further development of the invention provides that the readjustment device is assigned a measurement device for measuring a displacement of the measurement probe of the scanning probe measurement device during the examination of the measurement object by means of scanning probe microscopy.

In one expedient refinement of the invention, it may be provided that the readjustment device features a control device for producing readjustment data signals which are derived from data signals that characterize the displacement of the at least one subsection of the measurement object out of the observation region.

One advantageous embodiment of the invention provides that at least one of the following scanning probe measurement devices is implemented by the scanning probe measurement device: atomic force microscope, scanning tunneling microscope, scanning photon force microscope and scanning near-field microscope.

One preferred further aspect of the invention provides that at least one of the following optical measurement devices is implemented by the optical measurement system: optical microscope, fluorescence measurement device and absorption measurement device.

Further refinements of the invention will be explained in more detail below.

If the measurement object is moved, for example by means of a piezo component, and if the measurement object to be observed is fixedly connected to the sample (effectively a sample carrier), the measurement objective can be displaced parallel to the axis in the same direction and by the same length, for example by means of a piezo-driven adjusting element. In the case of piezo control, both components preferably have sensors and a corresponding control system so that the planned movement actually corresponds to the planned movement and both movements take place in the same way. In the case where the movement of the sample is not clearly defined before the experiment, it may be necessary to control the control mechanism of the optical system in such a way that the output signal of the sensors of the sample movement is switched as the input thereof. Instead of the sample movement by means of a piezo, other methods are also conceivable. Of course, this also applies to the movement of the optical system. In the case where an alternative method carries out a movement known to the input signal, the sensors proposed above can be omitted.

As an alternative or in addition to moving a measurement objective, the movement of the focusing plane may also take place by moving a lens in front of the measurement objective. This has the advantage, in particular, that a method such as SPhM, for example, works with another lens placed upstream.

If the measurement probe is moved instead of the sample (measurement object), then a focusing problem arises, for example, if the measurement object is connected to the measurement probe. In this case, the above proposals for refocusing apply accordingly.

A special situation arises as in the case of some measurement probes, for example with the cantilever in the AFM, the movement of the measurement probe is not uniform. Thus the movement is mediated via the base of the cantilever. The free end of the cantilever, or the end connected to the sample, is deflected out from the equilibrium, which is defined only by the spring, by the acting forces. As a result, depending on the force presently acting, the measurement object is not located in the focus. In such a case, therefore, the movement of the focusing plane must be adapted to the movement of the part of the measurement probe which is connected to the measurement object. In the case of the cantilever, for example, this will usually be an area at the end of the cantilever and can, if necessary, also be determined. In the case of the cantilever, for example, such a correction may take place by subtracting or adding the measured bending of the cantilever from or to the movement of the base. The prerequisite for this is calibration of the sensitivity of the structure to bending, which is known per se. The cantilever has been selected here as an example since it is a prominent example of a scanning probe. The same possibilities exist for other measurement probes with a similar property.

In a very large number of cases, the measurement object will be located between the base and the measurement probe and will be moved by the mechanical process. This movement will on the one hand be dependent on the relative movement of the base and the measurement probe relative to one another, or the part of the measurement probe to which the sample is connected. On the other hand, however, the movement will also be dependent on the nature of the sample as a whole in which the measurement object, for example a fluorophor, is incorporated. The movement of the focusing plane is then controlled via a method which is carried out in an analogue or preferably digital manner. This method assumes a model for the sample and can then determine a course of the measurement object in the vertical direction, for example from the starting situation of the measurement object or other information which is known about the sample, in conjunction with the control possibilities already mentioned above. A digital solution is preferred over an analogue solution, since a digital solution allows a greater flexibility. The invention is accordingly able to check models, but in particular to have the measurement object in the focusing plane at the appropriate moment during the experiment.

DESCRIPTION OF PREFERRED EXAMPLES OF EMBODIMENTS OF THE INVENTION

The invention will be explained in more detail below on the basis of examples of embodiments and with reference to figures of a drawing. The figures show.

Figure 1A:
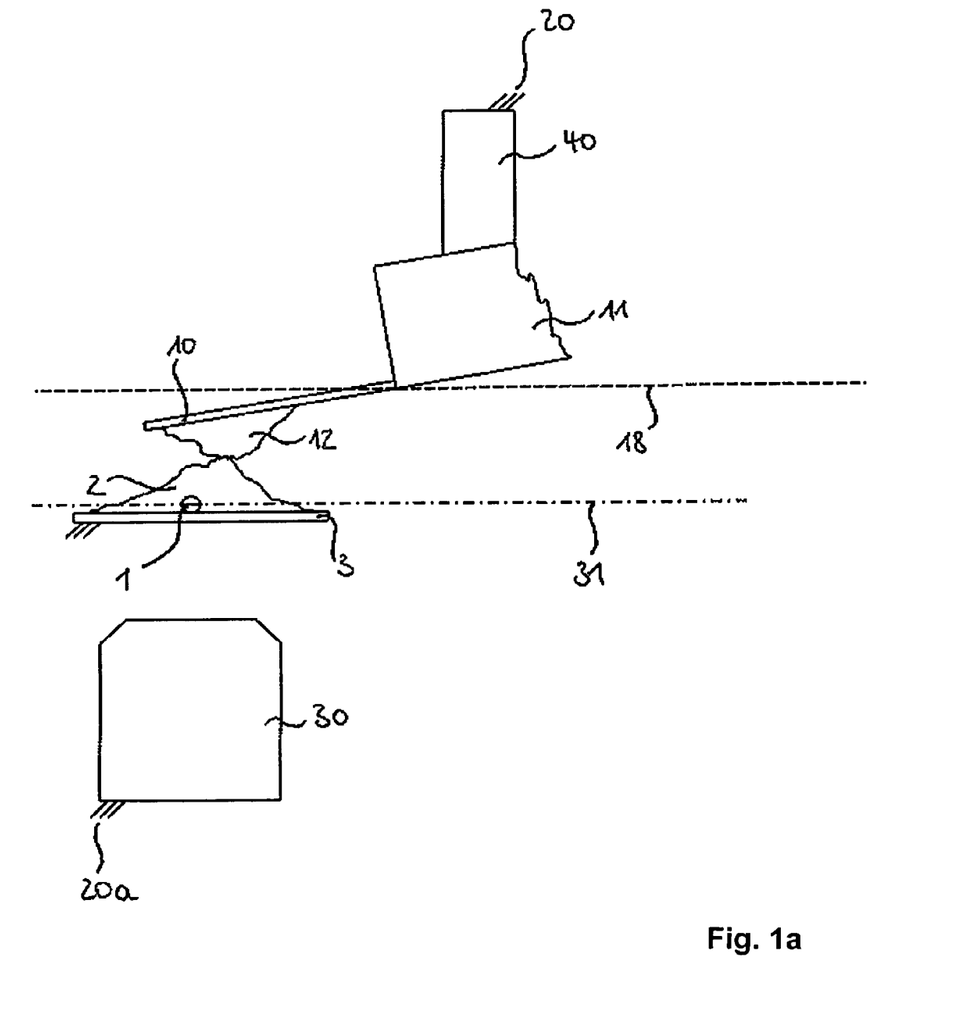
FIG. 1a a schematic diagram of a stretching experiment with a measurement probe on a measurement object in a starting state, FIG. 1b a schematic diagram of the stretching experiment with the measurement probe on the measurement object of FIG. 1a in a stretched state, FIG. 2a a schematic diagram of a stretching experiment with a measurement probe on a measurement object in a starting state, FIG. 2b a schematic diagram of the stretching experiment with the measurement probe on the measurement object of FIG. 2a in a stretched state, FIG. 3a a schematic diagram of a stretching experiment with a measurement probe on a measurement object in a starting state, FIG. 3b a schematic diagram of the stretching experiment with the measurement probe on the measurement object of FIG. 3a in a stretched state, wherein a readjustment has taken place, FIG. 4a a schematic diagram of a stretching experiment with a measurement probe on a measurement object in a starting state, FIG. 4b a schematic diagram of the stretching experiment with the measurement probe on the measurement object of FIG. 4a in a stretched state, wherein a readjustment has taken place, FIG. 5a a schematic diagram of a stretching experiment with a measurement probe on a measurement object in a starting state, and FIG. 5b a schematic diagram of the stretching experiment with the measurement probe on the measurement object of FIG. 5a in a stretched state, wherein a readjustment has taken place.
Figure 1B:
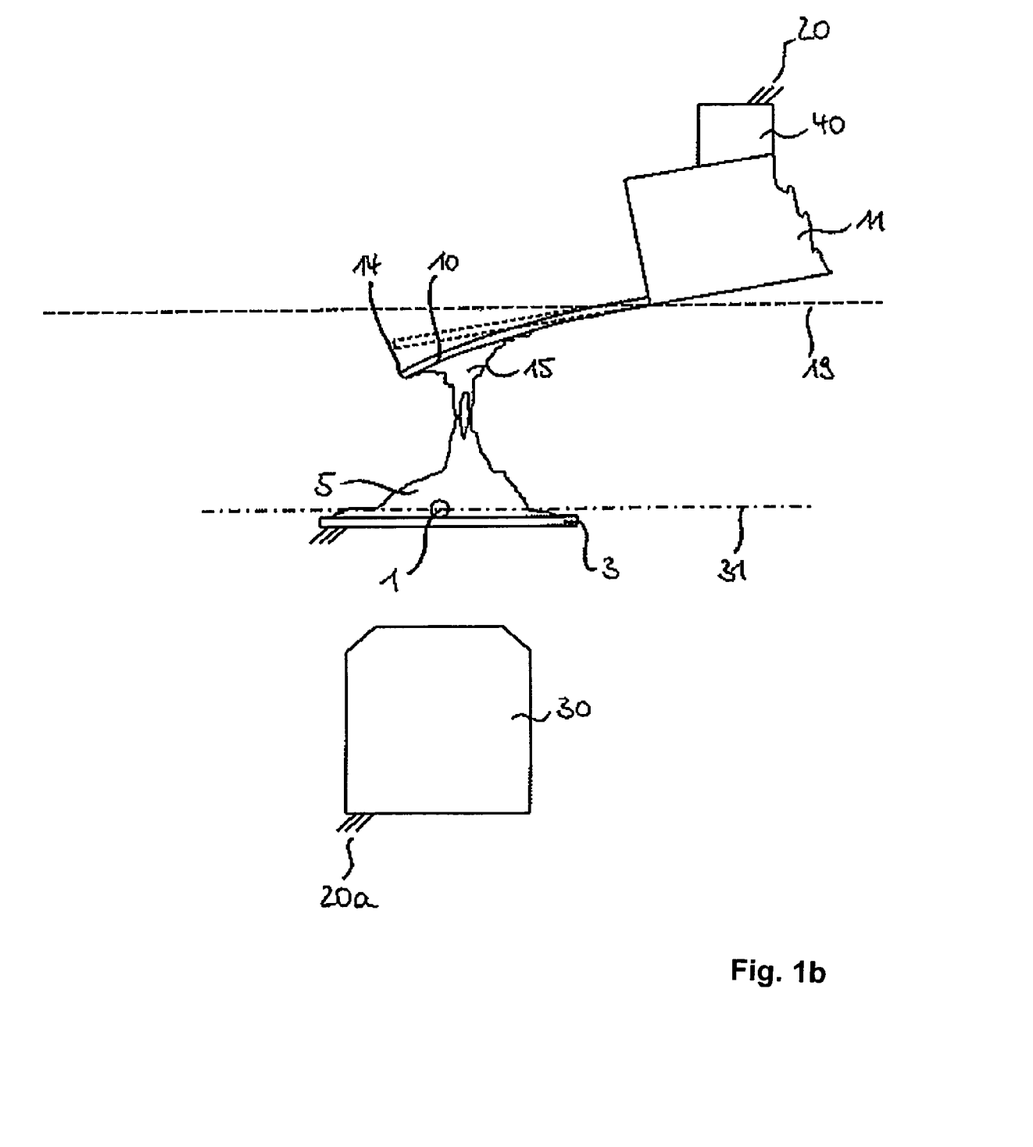

FIG. 1a shows a schematic diagram of a stretching experiment with a measurement probe 10 on a measurement object 1 in a starting state. FIG. 1b shows a schematic diagram of the stretching experiment of FIG. 1a with the measurement probe 10 on the measurement object 1 in a stretched state.

The measurement object 1 to be observed is a subsection of a cell 2 which is fixed to a base 3, also referred to as the support. The base is secured to a frame 20 which is shown schematically. The measurement object 1 may in a different embodiment be located between the cell 2 and the base 3 and establish a contact.

The cell 2 is then brought into contact with another cell 12 which is fixed to a measurement probe 10 designed as a cantilever. The cantilever 10 is fixed for handling purposes to a component 11, which is for example a silicon component and which in turn is connected via a piezo component 40 to a frame 20. Between the component 11 and the piezo component 40 there are usually further components which are omitted here for the sake of clarity. By means of a measurement objective 30 fixed to a further frame 20a and an optical device not shown in greater detail here, for example a commercially available inverted microscope, an observation region designed as a focusing plane 31 is set in such a way that the measurement object 1 can be sharply imaged. The measurement objective 30 is part of an optical measurement system by means of which the measurement object 1 is optically examined.

If, as shown in FIG. 1b, the piezo component 40 is shortened such that there is still contact between the two cells 2, 12, then a force acts on the cantilever 10. The latter bends from the original position, shown in dashed line in FIG. 1b, to a changed position 14. Since both cells 2, 12 change their shape, a shape-modified cell 5 and a further shape-modified cell 15 are produced. The travel brought about by the piezo component 40 is denoted by the distance between two auxiliary lines 18, 19. These are aligned with the base of the cantilever 10.

Since in this case the measurement object 1 is coupled to the base 3 and thus to another frame 20b, the position of the measurement object 1 does not change. Since the measurement objective 30 is connected to the further frame 20a, the movement of the cantilever 10 has no effect on the imaging during the optical examination of the measurement object 1 by means of the measurement objective 30.

Figure 2A:
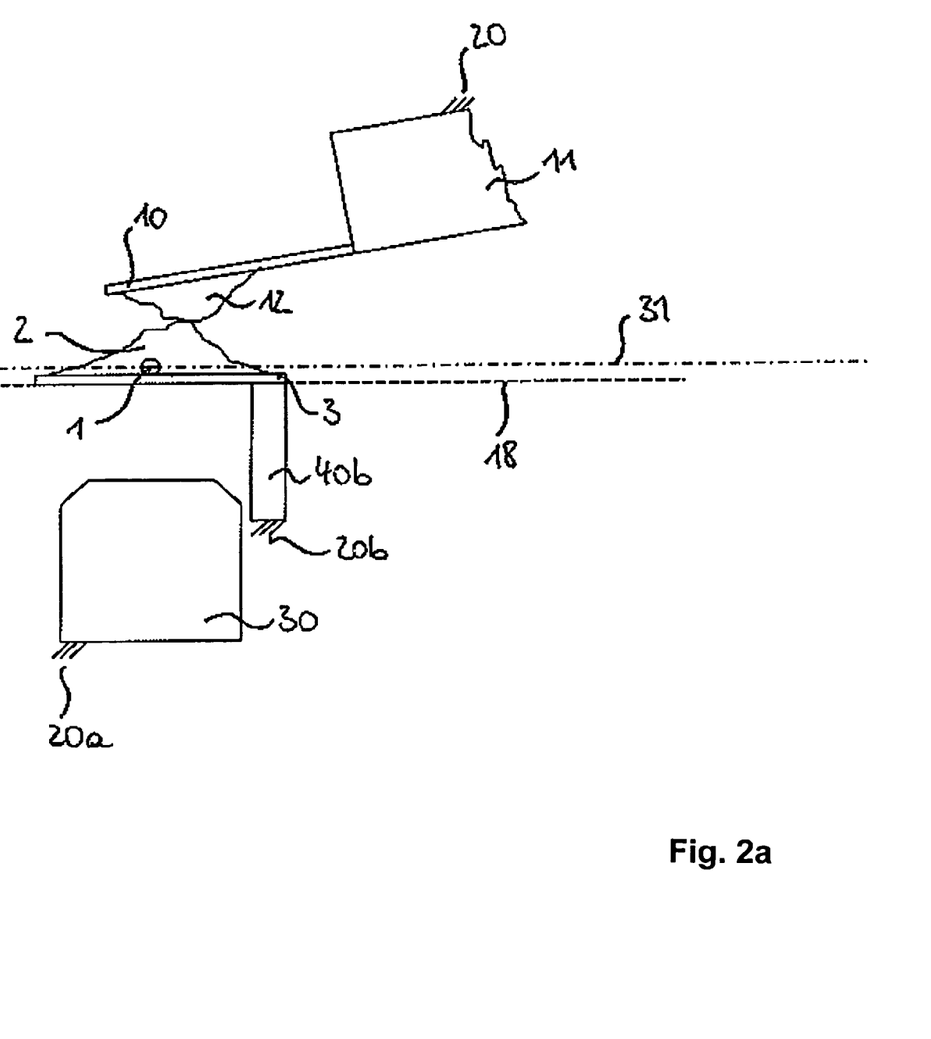
Figure 2B:
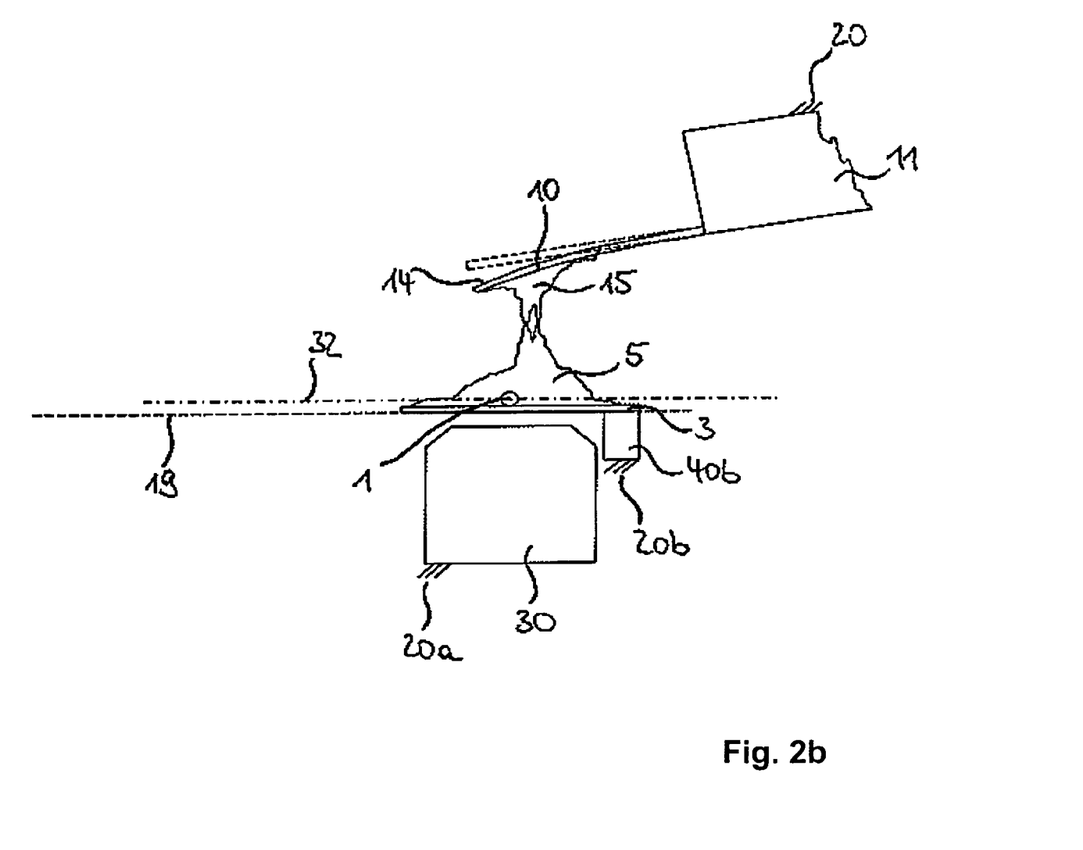

FIG. 2a shows a schematic diagram of a stretching experiment with a measurement probe 10 on a measurement object 1 in a starting state. FIG. 2b shows a schematic diagram of the stretching experiment of FIG. 2a with the measurement probe 10 on the measurement object 1 in a stretched state.

The starting situation in FIG. 2a corresponds substantially to the situation in FIG. 1a, apart from the fact that now the component 11 is fixed directly to the frame 20 and the base 3 is fixed to the other frame 20b via another piezo component 40b. Here, too, possible further components between the base 3 and the other piezo component 40b have been omitted without limiting the general nature.

If, as shown in FIG. 2b, the other piezo component 40b is shortened, the cantilever 10 and the cells 2, 12 once again bend. However, the measurement object 1 is no longer located in the focusing plane 31, but rather in a plane 32 and is accordingly imaged by the measurement objective 30 with a poorer optical quality. The quality of the imaging naturally depends greatly on the travel, which is once again denoted here by the two auxiliary lines 18, 19.

Figure 3A:
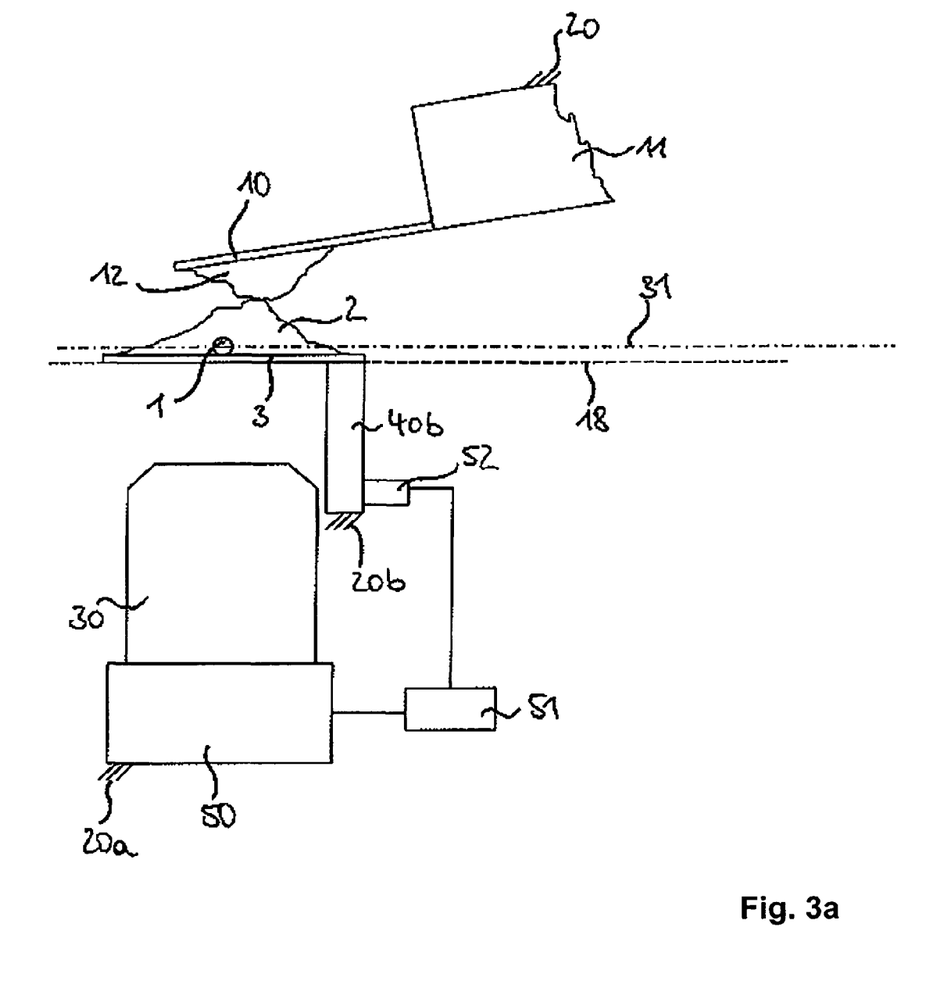
Figure 3B:
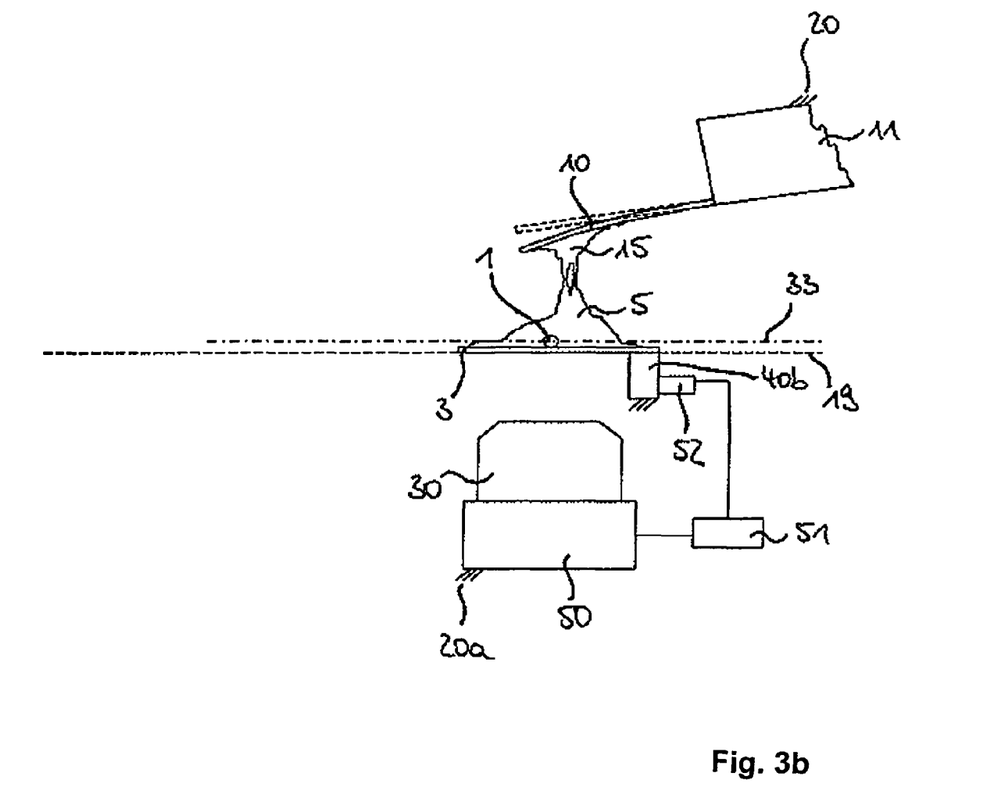

FIG. 3a shows a schematic diagram of a stretching experiment with a measurement probe 10 on a measurement object 1 in a starting state. FIG. 3b shows a schematic diagram of the stretching experiment of FIG. 3a with the measurement probe 10 on the measurement object 1 in a stretched state, wherein a readjustment has taken place.

The starting situation in FIG. 3a corresponds substantially to the situation in FIG. 2a. The only difference is that now the measurement objective 30 for the optical measurement is attached to a vertical adjustment device 50 which can be moved via a control mechanism 51. In addition, a sensor 52 is provided, by means of which the excursion of the other piezo component 40b or preferably also of the cell 2 can be measured.

FIG. 3b shows a situation in which once again the other piezo component 40b has been shortened. By means of the sensor 52, the excursion is measured and corresponding data signals are transmitted to the control mechanism 51. The control mechanism 51 then triggers a movement of the measurement objective 30 via the adjustment device 50, as a result of which a changed focusing plane 33 is produced, so that the measurement object 1 is once again located in the observation region of the measurement objective 30. This ensures that the measurement object 1 is always in the focus of the measurement objective 30.

Figure 4A:
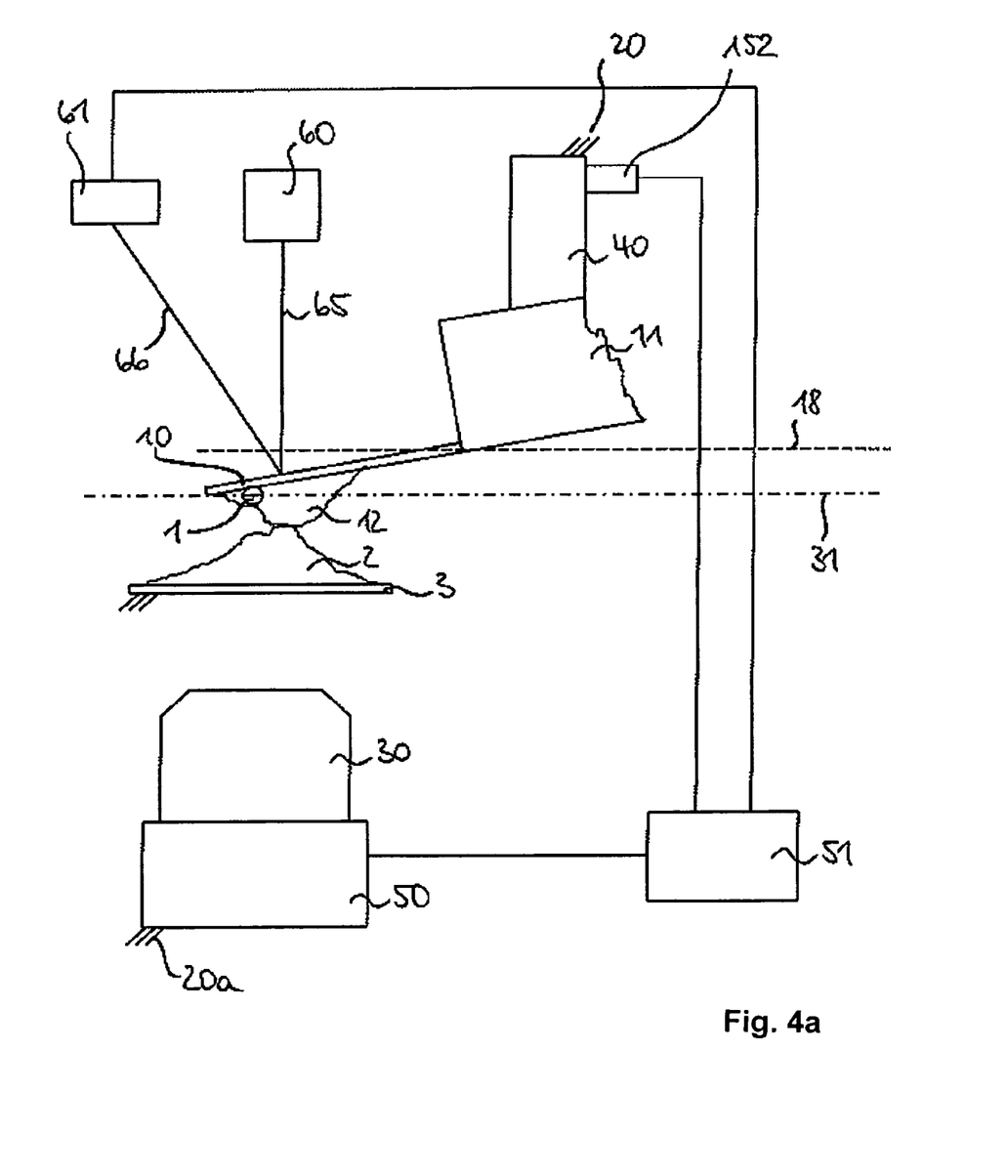
Figure 4B:
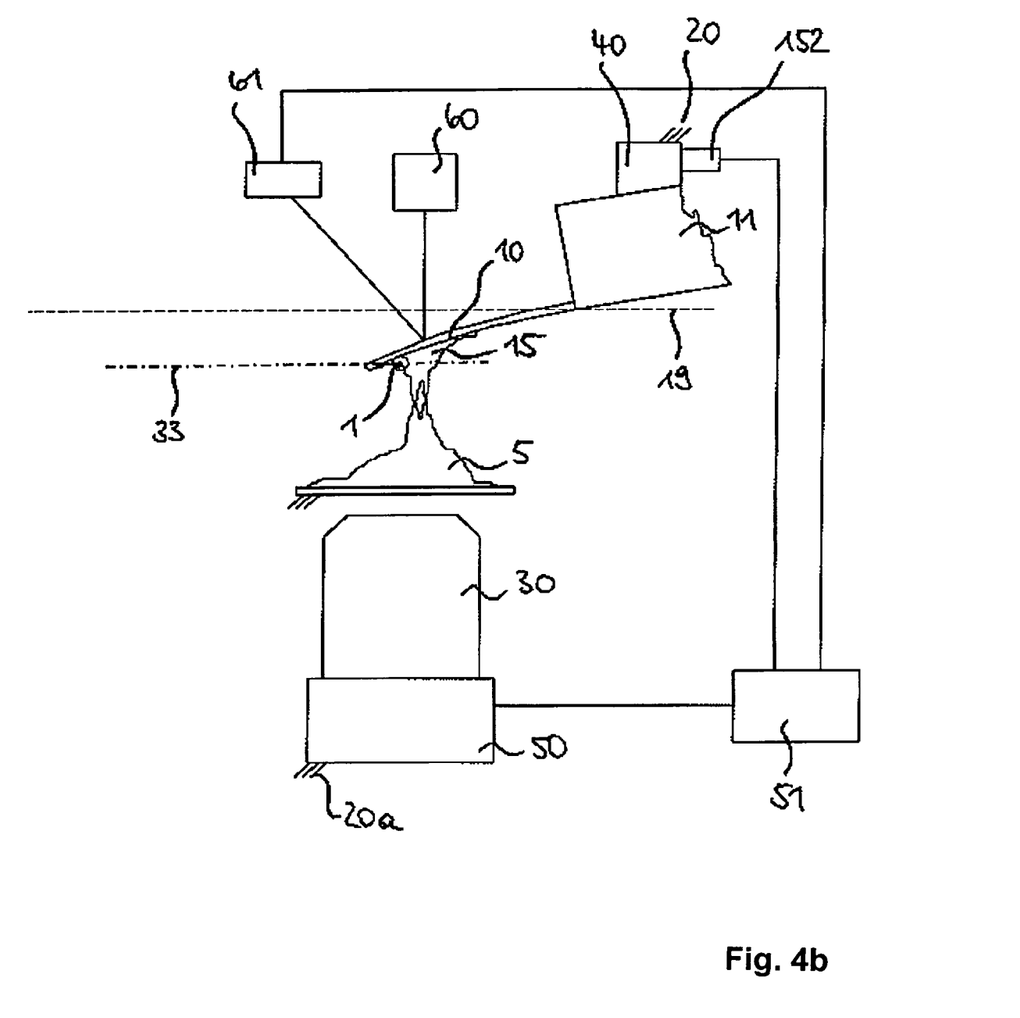

FIG. 4a shows a schematic diagram of a stretching experiment with a measurement probe 10 on a measurement object 1 in a starting state. FIG. 4b shows a schematic diagram of the stretching experiment of FIG. 4a with the measurement probe 10 on the measurement object 1 in a stretched state, wherein a readjustment has taken place.

In addition to the movement of the cantilever 10, in this embodiment account is also taken of a cantilever bending that is brought about by the examination by means of scanning probe microscopy.

FIG. 4a shows the starting situation, which is very similar to the situation in FIG. 1a. The differences lie in the position of the measurement object 1 and of the focusing plane 31 and also in the readjustment device including the adjustment device 50, the control mechanism 51, a sensor unit 152 as well as a laser 60 and a further sensor 61, which is for example a 2 segment photodiode.

In FIG. 4b, the piezo component 40 is shortened, as a result of which a new position is obtained for the measurement object, 1 which makes the changed focusing plane 33 (observation region) necessary. Due to the bending of the cantilever 10, however, the distance between the focusing plane 31 and the changed focusing plane 33 is not as great as the travel brought about by the piezo component 40, namely the distance between the two auxiliary lines 18, 19. This is taken into account by providing, in addition to a data signal from the sensor unit 152, also a data signal from the further sensor 61 and thus an indication of the bending of the cantilever 10. In this example of embodiment, the bending is measured by a light pointer in which, by means of the laser 60, a laser measurement beam 65 is focused onto the cantilever 10 and a reflected beam 66 is received by the further sensor 61 and evaluated. Such a manner of measuring the bending of the cantilever 10 is known per se to the person skilled in the art, and therefore there is no need for a more detailed description here. Besides the light pointer principle, further methods for measuring the bending are known and can likewise be used, for example measuring a deflection by means of an interferometer.

Figure 5A:
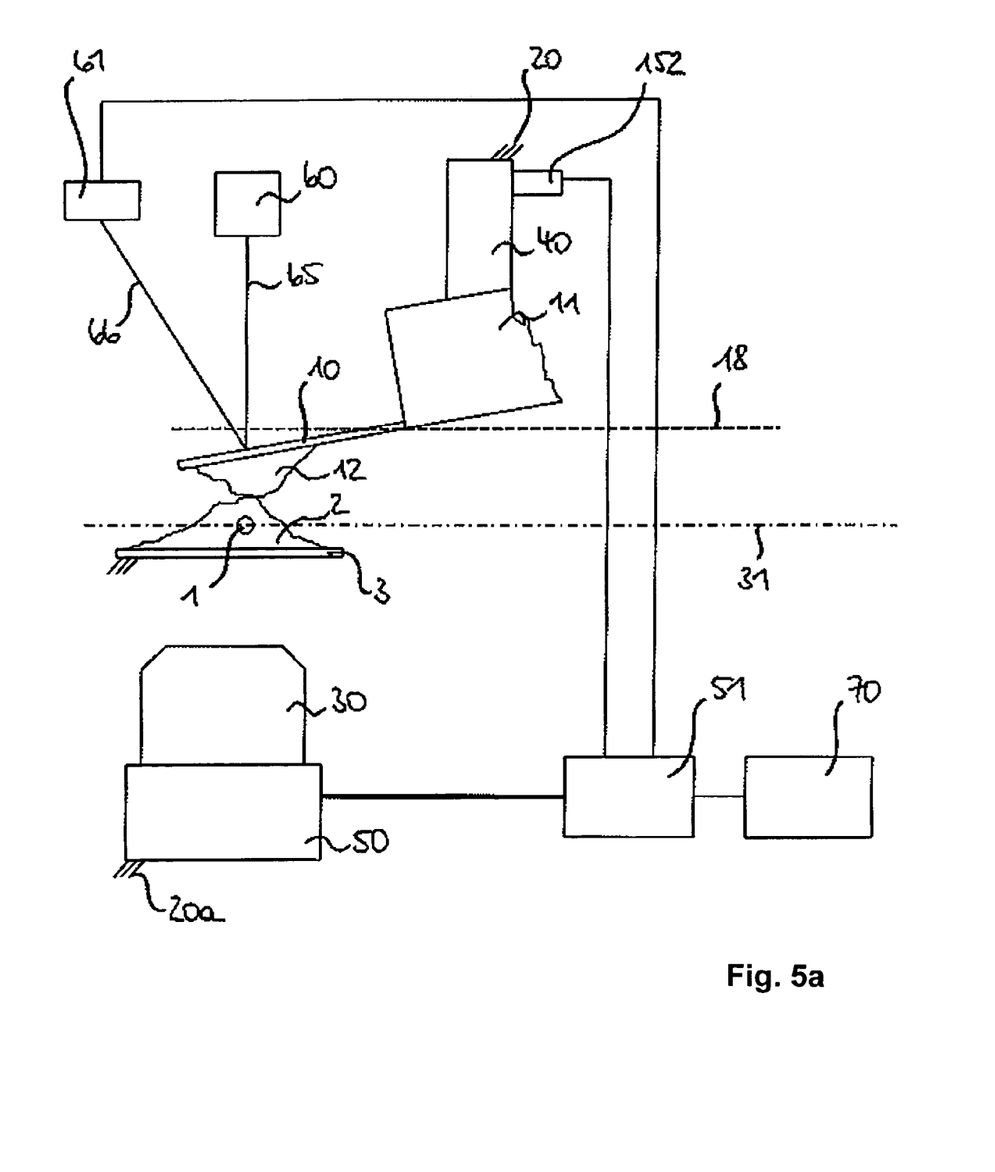
Figure 5B:
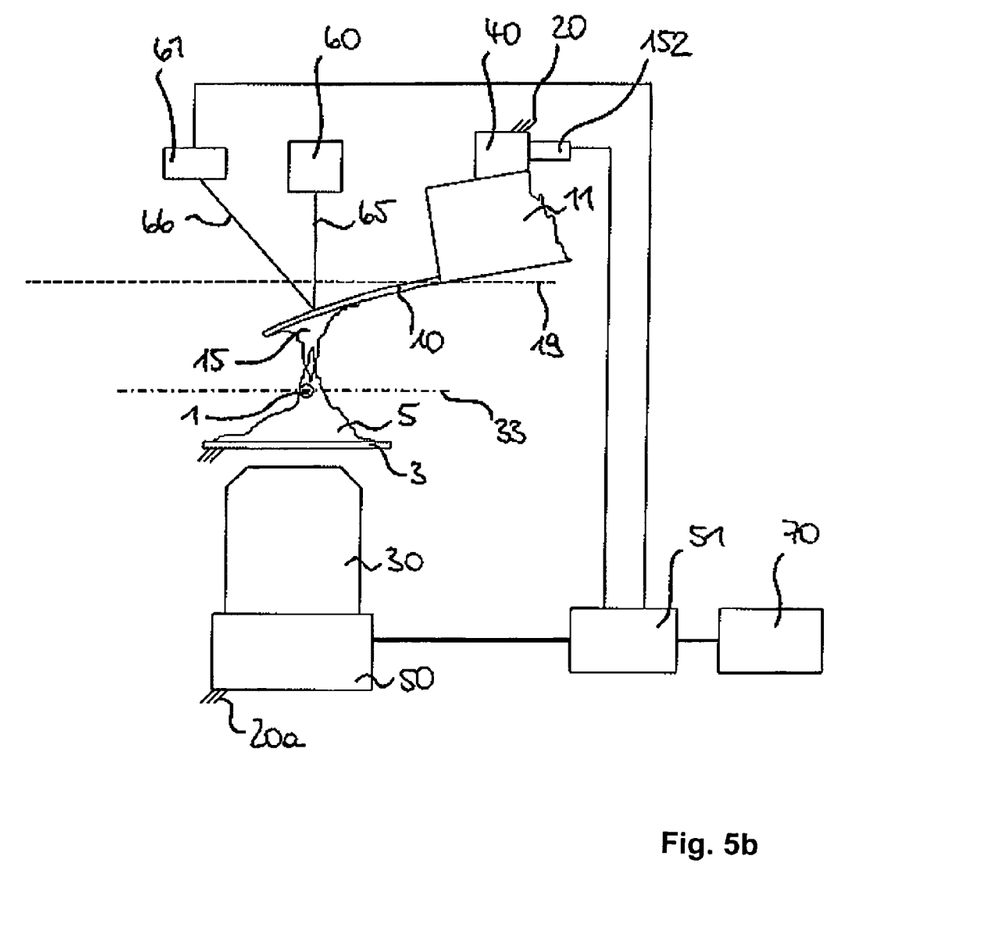

FIG. 5a shows a schematic diagram of a stretching experiment with a measurement probe 10 on a measurement object 1 in a starting state. FIG. 5b shows a schematic diagram of the stretching experiment of FIG. 5a with the measurement probe 10 on the measurement object 1 in a stretched state, wherein a readjustment has taken place.

The measurement object 1 is connected to the cell 2 in such a way that it moves as a result of the acting force or the expansion within the cell 2 or at least moves relative to the cantilever 10 and/or to the base 3.

FIG. 5a once again shows the starting situation, which differs only by a few features from that shown in FIG. 4a. On the one hand, the measurement object 1 is now arranged centrally in the cell 2. Furthermore, the control mechanism 51 is connected to a model component 70, for example an electronic memory, which contains information that can be evaluated electronically regarding a model of the vertical course of the measurement object 1 as a function of the acting force and the total excursion during the examination by means of scanning probe microscopy. From this information, the position of the measurement object 1 can be determined as a result of the measurement by means of scanning probe microscopy, so that the focus can be readjusted. The model component 70 and preferably also the control mechanism 51 are preferably implemented by a computer. Further parameters, for example the temperature or the pH of the cell 2, may also be included; however, these are not shown here for the sake of clarity. Assistance may also be provided by an evaluation of the optical signal measured by the optical measurement system.

FIG. 5b shows the mode of operation. The measurement object 1 has moved upwards, and the changed focusing plane 33 has been set successfully, although at the start of the experiment the distance of the focusing plane 31 to the new position of the focusing plane 33 may differ greatly from the travel movement denoted by the two auxiliary lines 18, 19. This can also be achieved without involving an evaluation unit of the microscope.

One advantage of the invention consists in that the optical measurement can be carried out at a very specific point in time, for example upon the breaking of a contact during the examination by means of scanning probe microscopy, and for the rest of the time a shutter prevents fluorescence molecules, for example, from bleaching out.

If, in this configuration, the base 3 were to be moved instead of the cantilever 10 or if the measurement object 1 were to be bound to the upper cell 12 or even located between the two cells 2, 12, the situation would be similar, in other words a model would have to be used which, with the aid of the excursion and the cantilever bending and optionally further parameters, is able to pre-calculate a course of the measurement object 1, namely the local position thereof, with suitable accuracy.

The illustration of the two cells 2, 12 on either side is merely an example of a configuration. Other possible arrangements may also be provided, such as for example one cell on the cantilever 10 and a homogeneous coated sample as the base.

The displacement of the measurement object 1 brought about as a result of the examination by means of scanning probe microscopy can also be caused by a compression.

The features of the invention which are disclosed in the above description, the claims and the drawing may be important both individually and in any combination for implementing the invention in its various embodiments.

What is claimed is:

1. A method for examining a sample, said method comprising the steps of:
    examining the sample by scanning probe microscopy, said step of examining the sample includes using a measurement probe of a scanning probe measurement device,
    directly optically examining at least one subsection of the sample by an optical measurement system, said step of directly optically examining the at least one subsection includes performing the optical examination in an observation region associated with the optical measurement system,
    correcting a displacement due to the scanning probe microscopy of the at least one subsection of the sample relative to the observation region associated with the optical measurement system, said step of correcting a displacement includes correcting using data signals from the scanning probe microscopy such that the at least one displaced subsection of the sample is arranged back in the observation region of the optical measurement system by a readjustment device, and
    processing the data signals that characterize the displacement by the readjustment device.

2. The method according to claim 1, further comprising the step of setting a changed observation region when the at least one subsection of the sample is arranged back in the observation region of the optical measurement system.

3. The method according to claim 2, wherein said step of setting a changed observation region includes displacing the optical measurement system.

4. The method according to claim 1, further comprising the step of setting a change in positioning of the sample when the at least one displaced subsection of the sample is arranged back in the observation region of the optical measurement system.

5. The method according to claim 1, wherein said step of correcting a displacement includes displacing the at least one subsection of the sample out of observation region in at least one of the following ways: three-dimensional displacement and displacement in a two-dimensional plane.

6. The method according to claim 1, further comprising forming data signals by the scanning probe microscopy, wherein said step of forming data signals includes forming data signals that characterize displacement of the sample that are derived using data signals from said step of examining the sample by scanning probe microscopy.

7. The method according to claim 6, wherein said step of forming data signals includes using the data signals from said step of examining the sample by scanning probe microscopy to determine data signals for a bending of the measurement probe.

8. The method according to claim 6, wherein said step of forming data signals includes using the data signals from said step of examining the sample by scanning probe microscopy to determine data signals for a displacement of a measurement probe holder.

9. The method according to claim 6, wherein said step of forming data signals includes using the data signals from said step of examining the sample by scanning probe microscopy to determine data signals for a displacement of a support of the sample.

10. The method according to claim 6, wherein said step of forming data signals includes using the data signals from said step of examining the sample by scanning probe microscopy to determine data signals for a modeled behavior of the sample.

11. The method according to claim 6, wherein said step of forming data signals includes using the data signals from said step of examining the sample by scanning probe microscopy that comprise atomic force data signals.

12. The method according to claim 11, wherein said step of forming data signals includes using the data signals from said step of examining the sample by scanning probe microscopy that comprise distance spectroscopy data signals.

13. The method according to claim 1, wherein said step of examining the sample by scanning probe microscopy includes using the scanning probe measurement device carrying out at least one of the following methods: atomic force microscopy, scanning tunneling microscopy, scanning photon force microscopy and scanning near-field microscopy.

14. The method according to claim 1, wherein said step of directly optically examining at least one subsection of the sample by the optical measurement system includes carrying out at least one of the following methods: examination by means of optical microscopy, fluorescence measurement method and absorption measurement method.

15. The method according to claim 1, wherein said step of directly optically examining at least one subsection of the sample includes using a focusing region of the optical measurement system as the observation region and said step of correcting a displacement includes arranging back the at least one displaced subsection of the sample in the focusing region of the optical measurement system by the readjustment device.

16. An apparatus for examining a sample, comprising:
    a scanning probe measurement device for examining the sample by scanning probe microscopy, and
    an optical measurement system for directly optically examining the sample, the optical measurement system including a measurement objective disposed in a location below a location of the sample; and
    a readjustment device provided and configured to arrange back in an observation region associated with the optical measurement system, at least one subsection of the sample which is optically examined by the optical measurement system in the observation region associated with the optical measurement system, when the at least one subsection of the sample has been displaced out of the observation region as a result of a displacement brought about by the examination by the scanning probe microscopy, the readjustment device processing data signals that characterize the displacement.

17. The apparatus according to claim 16, wherein the readjustment device comprises a positioning device of the optical measurement system for displacing at least one displaceable part of the optical measurement system.

18. The apparatus according to claim 16, wherein the readjustment device comprises a positioning device of the measurement probe of the scanning probe measurement device for displacing the measurement probe.

19. The apparatus according to claim 16, wherein the readjustment device comprises a positioning device of a support for the sample for displacing the sample.

20. The apparatus according to claim 16, wherein the readjustment device is assigned a measurement device for measuring a bending of the measurement probe during the examination of the sample by the scanning probe microscopy.

21. The apparatus according to claim 16, wherein the readjustment device is assigned a measurement device for measuring a displacement of a holder for the sample during the examination of the sample by the scanning probe microscopy.

22. The apparatus according to claim 16, wherein the readjustment device is assigned a measurement device for measuring a displacement of a measurement probe of the scanning probe measurement device during the examination of the sample by the scanning probe microscopy.

23. The apparatus according to claim 16, wherein the readjustment device features a control device for producing readjustment data signals which are derived from the data signals that characterize displacement of the at least one subsection of the sample out of the observation region.

24. The apparatus according to claim 16, wherein at least one of the following scanning probe measurement devices is implemented by the scanning probe measurement device: atomic force microscope, scanning tunneling microscope, scanning photon force microscope and scanning near-field microscope.

25. The apparatus according to claim 16, wherein the at least one of the following optical measurement devices is implemented by the optical measurement system: optical microscope, fluorescence measurement device and absorption measurement device.

* * * * *